J. W. ISHERWOOD & J. W. STEWART.
CONSTRUCTION OF TANK VESSELS.
APPLICATION FILED AUG. 17, 1916.

1,252,008.

Patented Jan. 1, 1918.
9 SHEETS—SHEET 6.

Inventors
Joseph W. Isherwood and
John W. Stewart, by

Attorney

UNITED STATES PATENT OFFICE.

JOSEPH WILLIAM ISHERWOOD AND JOHN WILLIAM STEWART, OF LONDON, ENGLAND.

CONSTRUCTION OF TANK VESSELS.

1,252,008.   Specification of Letters Patent.   Patented Jan. 1, 1918.

Application filed August 17, 1916. Serial No. 115,519.

*To all whom it may concern:*

Be it known that we, JOSEPH WILLIAM ISHERWOOD and JOHN WILLIAM STEWART, both subjects of the King of Great Britain, residing at London, England, have invented certain new and useful Improvements in Construction of Tank Vessels; and we do hereby declare the following to be a full, clear, and exact description of the invention, such as will enable others skilled in the art to which it appertains to make and use the same.

This invention relates to vessels especially adapted for carrying liquid cargoes, and has for its object to provide a construction which will be seaworthy in every respect, while at the same time requiring a less total weight of metal than has been heretofore necessary in bulk liquid carrying vessels of the same kind and strength.

With these and other objects in view the invention consists in the novel details of construction and combinations of parts more fully hereinafter disclosed and particularly pointed out in the claims.

In order that the invention may be the more clearly understood it is said:—Tank vessels of this nature heretofore built, have been of the three following classes;—first, said vessels have been provided with several transverse bulk-heads and a fore and aft middle line bulk-head, the latter considerably increasing the longitudinal strength; second, said vessels have been provided with several transverse, and two central fore and aft bulk heads, the latter also giving increased longitudinal stiffness; and, third, said vessels have been provided with cylindrical tanks similar to cable tanks, which have been either capable of removal from the vessel, or they have been formed integral with the structure of the vessel.

In all three classes, and especially in the third class of vessel, or those heretofore built with cylindrical tanks, full advantage has not been taken of the opportunity to make the tanks themselves contribute to the longitudinal strength of the vessel.

Accordingly, the main object of the present invention is to so arrange the tanks, and to so distribute the metal in the vessel, that the tanks themselves will more materially add to the longitudinal strength of the vessel, thereby more effectually saving in the total weight of metal necessary to build a seaworthy ship.

In addition to the above, the tanks in this invention are preferably made of a boiler like construction, which reduces the labor as well as the weight, and minimizes the necessary stiffening without in any way interfering with the strength requisite for seaworthiness and for a proper classification. Stated in still other language, in vessels constructed in accordance with the present invention the tanks are of a circular, or approximately circular cross section, and they are preferably arranged as a series of circles that overlap or encroach upon each other when viewed in plan. In order to securely fasten the tanks together and thereby bring out their full strength for the purpose of longitudinally strengthening the vessel, a portion of the wall of each tank, as seen in plan, is omitted or cut away, so that a portion of the wall of one tank encroaches on the interior of its adjacent tank thereby permitting the two tanks to be rigidly attached to each other along a plurality of vertical lines transversely spaced apart. When the entire series of tanks are thus efficiently attached to each other, they collectively add to the longitudinal strength of the vessel, or serve the functions of longitudinal bulk heads, all as will presently appear.

The cutting away, or encroachment of the tanks on one another further enables the utilization to the utmost of the space in the central portion of the vessel, and therefore the tanks need not be of an inconvenient diameter. In addition, this construction insures a simpler and better attachment to the main structure of the vessel than is the case with separate cylindrical tanks. Especially may the tanks be the more easily attached to the shell and deck platings and to the double bottom plating, or to a seating for the tanks, located at about the same height as the top plating of the double bottom, as will also presently appear.

The above construction of tank vessels, especially adapted for carrying liquids in bulk, can be applied either to old vessels already built, or to newly designed vessels as may seem most desirable or convenient at the time.

Referring to the accompanying drawings forming a part of this specification in which like numerals designate like parts in all the views:—

1 indicates the outer shell plating of the vessel, 2 the top plating, or inner bottom of said vessel, and 3 the space between the inner and outer platings 1 and 2.

The space 3 may be divided off by the longitudinal side walls or girders 4 and by the central longitudinal girders 5 as is usual in such vessels. Additional longitudinals such as 100, 101, 102, and 103 may also be provided when desired.

Figure 3:
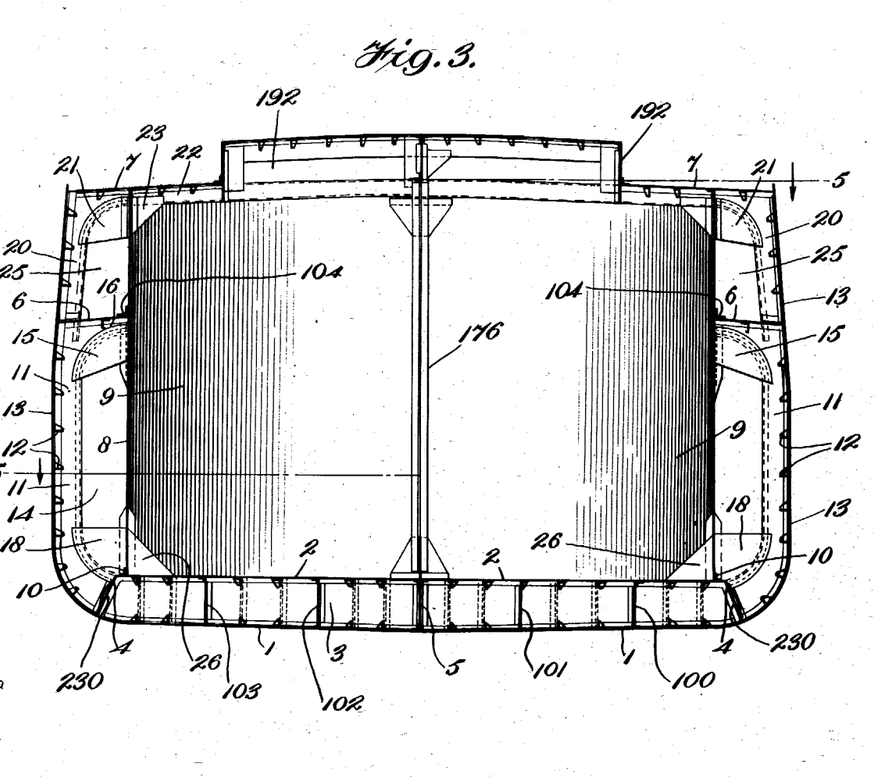
Fig. 3 is a transverse sectional view along the line 3—3 of Fig. 5 looking in the direction of the arrows.

In the case of converting old vessels to this construction, the vessel to be converted may, for example, have one or more lower decks such as 6, see Fig. 3, and an upper deck such as 7. The lower deck or decks are cut away wherever necessary to accommodate the vertical walls 8, of a tank such as 9 and which tanks are fitted in the vessel in the manner now to be more fully described.

The said tank 9, for example, conveniently rests upon the top plating 2 or in single bottomed vessels, upon a seating provided for said tank 9, and said top plating is cut away as indicated at 63 in order to make the space 3 of the double bottom a portion of the liquid carrying space of tank 9 as will be readily understood.

The said wall 8 of the liquid carrying tank 9 is conveniently secured to the top plating 2 as by the circular angle bars or other suitable sections 10, which may be securely riveted substantially all around to the said wall 8 and to the said top 2 or other seating for the tank 9. The widely spaced deep Isherwood transverses are illustrated at 11, and the closely spaced shallow longitudinals of the Isherwood system, are indicated at 12. Between the vertical wall 8 of the cargo carrying tank 9 and the outer shell side plating 13, is the longitudinal space 14 which may be conveniently utilized for liquid or other cargo, as will likewise presently appear.

Across the space 14 is the stiffening plate or member 15 rigidly secured to the Isherwood transverse 11 and to the vertical wall 8 of the tank 9 as well as to the transverse beam or other stiffening member 16 as will be clear from Fig. 3. Likewise across the bottom of the space 14 is a similar stiffening member 18 secured to the tank wall 8 near its bottom and to the Isherwood transverse 11 near the bilge of the vessel.

The tank wall 8 preferably extends up to the top deck 7, and is efficiently secured to the longitudinal and transverse beams of said deck, so as to make the plating of deck 7 aid in bearing any strains that may be brought on said tank wall. On the exterior of the tank and secured to the Isherwood transverse 20 is a plate or stiffening member 21, in all respects similar to the plate 15, which plate 21 is likewise secured to the top portion of the wall 8 and to the transverse beam 22, so as to further make the plating of deck 7 aid in bearing the strains of said tank wall. Opposite the plate 21 on the inside of the tank 9 is a stiffening plate 23 secured to the beam 22 and to the inside of the wall 8 as will be clear from the drawings.

It will thus be seen that the vertical wall 8 of the tank 9 is made an integral part of the plating all around its circumference, so that any longitudinal strains brought on said wall 8 will be partially borne by the bottom plating.

The circumferential angle fastening 104 in all respects similar to the fastening 10 likewise causes the strains of the vertical wall 8 to be partially borne by said plating 6.

It will also be seen that the members 21, 15, 18, 20 and 11 constitute what might be called a diaphragm or a partial bulk-head cut away to form the longitudinal spaces 14 and 25, adapted to receive liquid or other cargo. It will be further seen below, that each of the other tanks is provided with fastening members substantially the same as those just described.

In order to make the construction the more complete on the inside of the tank 9 there is located opposite the member 18 a stiffening plate 26, which is likewise secured to the inner surface of the wall 8 and to the top plating 2 or other seating for the tank as will be clear from the drawings.

Figure 2:
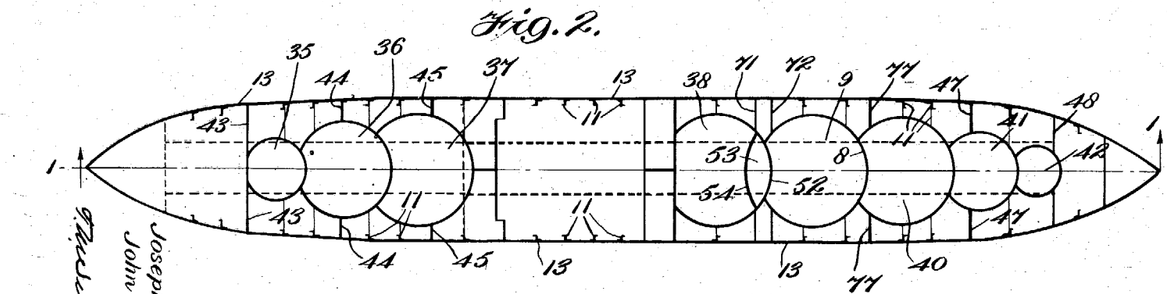
Fig. 2 is a diagrammatic sectional plan view of the vessel shown in Fig. 1.

Referring now more particularly to Fig. 2 the above constructions are repeated for each tank of the series of tanks 35, 36, 37, 38, 9, 40, 41 and 42 which are shown as partially cut away in order that the walls of the one tank may enter into the walls of an adjacent tank and be efficiently secured to each other as will now be disclosed.

That is to say, the series of tanks thus set forth form a continuous longitudinal stiffening construction, which efficiently performs the function of one or more longitudinal bulk-heads. A transverse bulk-head at one end of the series is conveniently fitted across the vessel as at 43 and at the other end of the series, another bulk-head 48 is likewise fitted across the vessel. In addition to the bulk-heads 43 and 48 partial bulk-heads are represented at 44, 45, 47, 71, 72, 77 and the detail fastenings of which will be more fully disclosed below.

Figure 5:
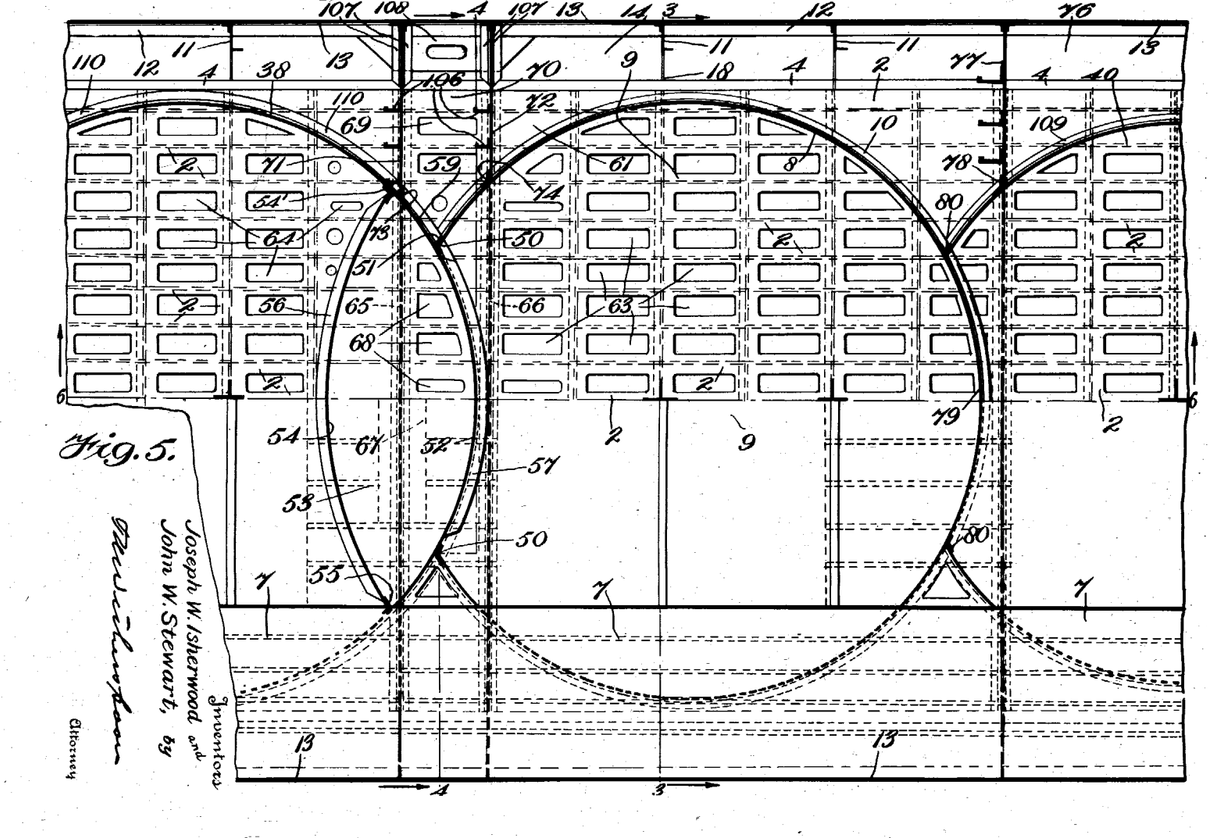
Fig. 5 is a sectional plan view taken on the line 5—5 of Fig. 3.

As will be clear from Fig. 5, the tank 9 is cut away or a portion thereof omitted, as at 50, and an efficient angle or other fastening 51 is joined to the vertical cutaway walls of the said tank 9 and the outer wall 52 of the tank 38 so as to form a liquid tight joint between the tanks 9 and 38. Accordingly, any longitudinal strains which may be transmitted to the tank 38 for example, will be further transmitted to the tank 9. It frequently becomes desirable to provide a space such as 53 between a pair of tanks such as 38 and 9, to serve as a pump room, cofferdam or liquid space and in such case a curved partition wall 54 is conveniently provided on the inside of the tank 38 and efficiently joined to the walls of said tank as by the angle members 54' and 55. In order to stiffen the partition wall 54 a plurality of hoop like members 56 suitably spaced in a vertical direction, may be provided and in order to stiffen the wall 52 of the tank 38, a similarly spaced hoop like member 57 may be provided. These said hoop like members may conveniently take the form of curved angle bars as will be clear from Fig. 6.

Figure 6:
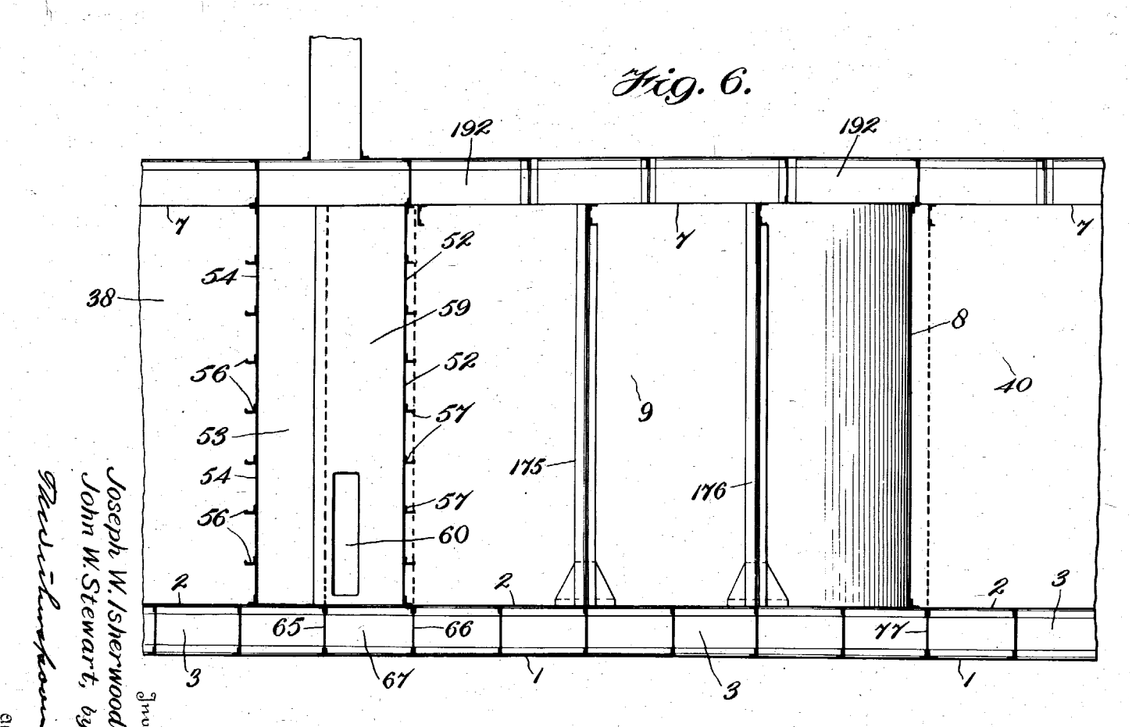
Fig. 6 is an enlarged longitudinal sectional view of a portion of the parts shown in Fig. 5 and taken on the line 6—6 of said figure.

The space 53 is thus segregated from the tanks 9 and 38, and if desired, an opening through that portion 59 of the wall of the tank 38 may be had as indicated at 60, see Fig. 6, thus affording communication between the space 70 outside the tanks and the segregated space 53. The top plating 2 is indicated in Fig. 5, as provided with the holes or orifices 63 above mentioned so that liquid may readily pass from the inside of a tank such as 9 into the space 3 of the double bottom, and similar holes indicated at 64, may be provided in that portion of the top plating 2 underlying the tank 38. In order to prevent liquid from the tank 38 passing into the tank 9 through the space 3 of the double bottom, it is convenient to provide continuous transverse floors 65 and 66 which extend liquid tight athwart ships from side to side and completely cut off communication from the one tank to the other.

The effect of thus providing liquid tight continuous floors 65 and 66 is to further cut off a space 67 in the double bottom between said floors 65 and 66, which space is entered by the holes 68 in the space 53 and also entered by the holes 69 in the space 70. It follows that the space 53 may readily communicate with the space 70 through the double bottom when desired. The space 70 is conveniently formed by the partial bulk-heads 71 and 72 which are provided with the angle fastenings 73 and 74 efficiently attaching said bulk-heads to the tanks 38 and 9 respectively.

Figure 4:
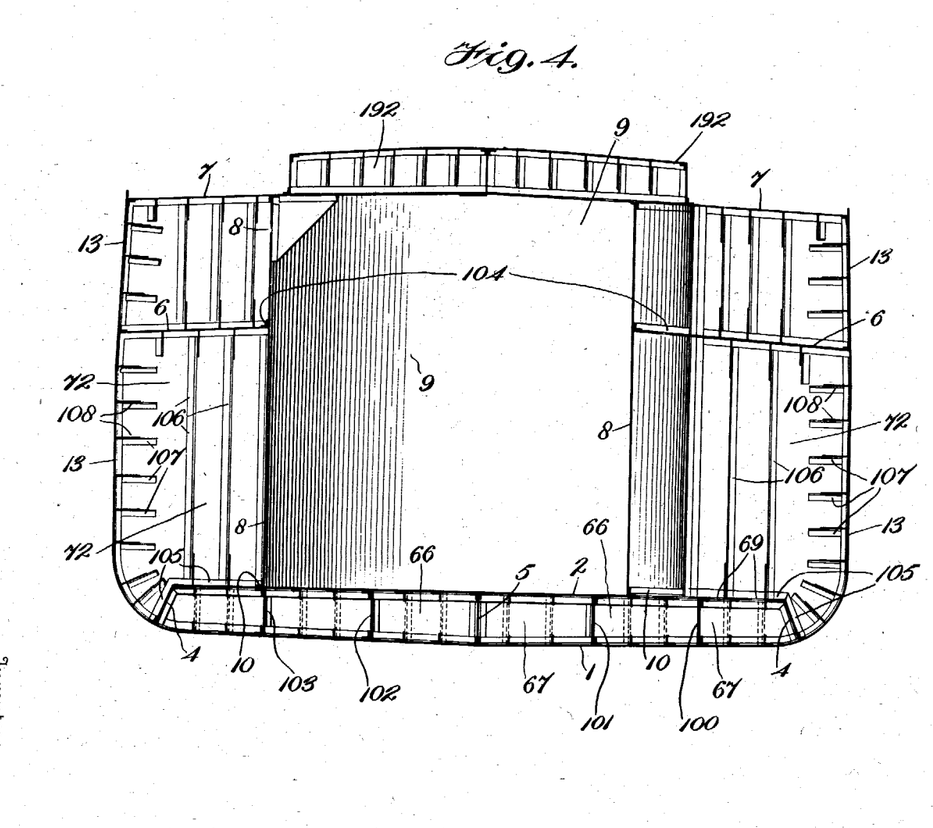
Fig. 4 is a sectional view taken on the line 4—4 of Fig. 5 looking in the direction of the arrows.

Said partial bulk-heads are conveniently attached to the top plating 2 and to the longitudinal girder 4 as by the angle fastenings 105, see Fig. 4. Said partial bulk-heads are also conveniently stiffened as by the vertically disposed angles or other stiffeners 106. Horizontally disposed angles 107 may be further provided, and between said angles there may be fitted the longitudinal stiffening members or plates 108 which effectually resist any collapsing pressures that may be brought on said partial bulk-heads 71 and 72.

The said bulk-heads 71 and 72 extend out to the shell plating 13 of the vessel as shown and may constitute continuations of the widely spaced Isherwood transverses, or not, according to the particular construction employed, all as will be clear to naval architects.

By omitting to cut away the partial bulk-heads 71 and 72, the space 70 as well as the space 53 may be kept dry or free from liquid, while the spaces such as 14 and 61 may be filled with liquid when desired. The spaces 14 and 61 are conveniently cut off from the similar adjoining spaces such as 76 as by an unperforated partial bulk-head 77 joining the tank 40 and efficiently attached thereto as by angle members such as 78. The said tank 40 as indicated, in Fig. 5, is attached to the wall portion of the tank 9 as by the efficient angle fastenings 80 and in all cases to the top plating 2 by the complete circular angles 109. Likewise the tank 38 is secured to the top plating 2 by the similar complete angle fastening 110, all as will be clear to naval architects.

Should the opening 60 be omitted through the wall portion 59, of the tank 38, or should said opening be closed liquid tight, then of course, liquid could be carried in either or both the spaces 53 and 70, as above intimated.

Of course, it will be understood that the fastenings described in connection with tanks 9 and 38, in so far as they are applicable, are or may be repeated in connection with every other pair of tanks.

Coming now to the somewhat modified form of the invention illustrated in Figs. 7 to 11 inclusive, and which modification is especially adapted for boats of new design it is said:—The construction here shown is closely analogous to that just described, but there being no decks to cut away it is not precisely the same as will now appear:— But in so far as it is practicable the parts that are common to the preceding and the present construction have been given the same reference characters.

Figure 7:
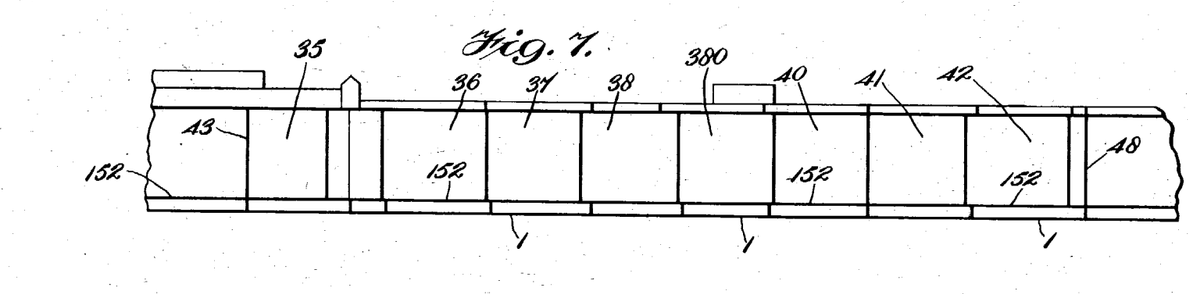
Fig. 7 is a diagrammatic sectional view partly in elevation of a newly designed vessel provided with the construction forming the subject of this invention.
Figure 8:
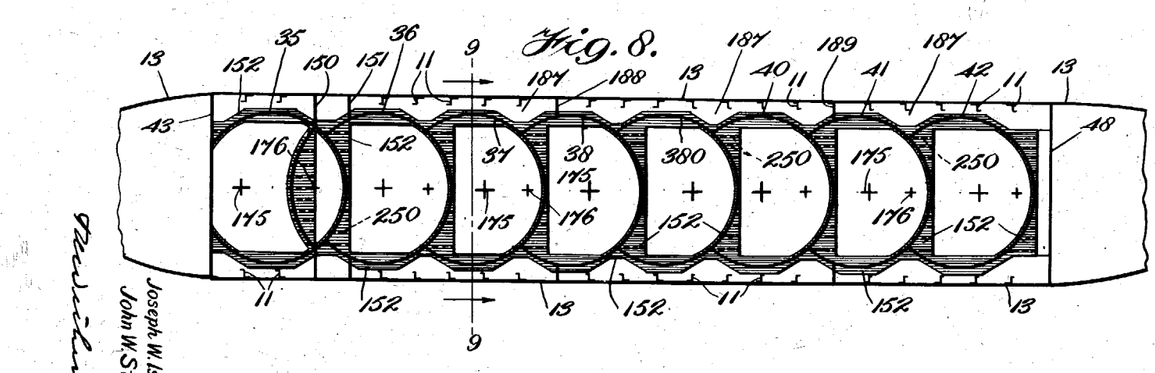
Fig. 8 is a diagrammatic sectional plan view of a portion of the parts shown in Fig. 7.

Referring first to Figs. 7 and 8, in the newly designed vessel, the machinery instead of being located near the center of the vessel, is located near the stern thereof, and accordingly, the series of tanks lettered 35, 36, 37, 38, 380, 40, 41 and 42 are joined together in one continuous series instead of in two separate series. Further, the partial bulk-heads such as 71 and 72 appearing in Fig. 2, have been transferred nearer the stern of the vessel and now appear between the tanks 35, and 36, being lettered respectively 150 and 151.

Figure 1:
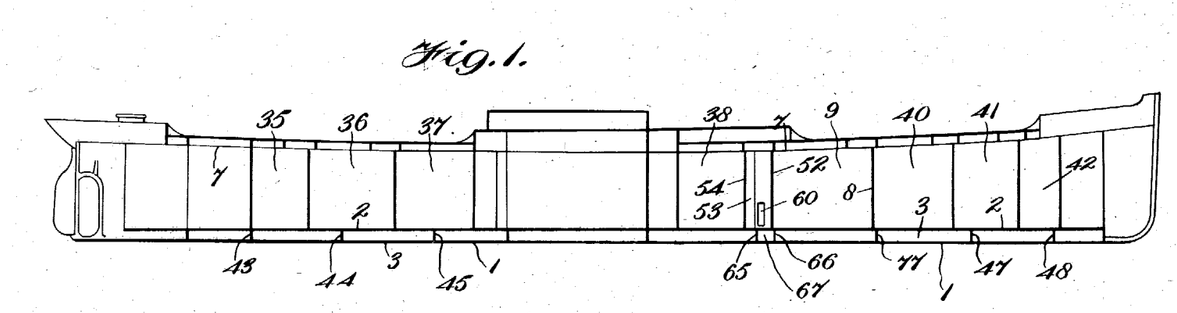
Fig. 1 is a diagrammatic longitudinal sectional view taken on the line 1—1 of Fig. 2, showing a cargo carrying vessel converted into the new construction.

Another important difference of the construction found in Fig. 8 over that found in Fig. 2 is the seating 152 for the tanks which seating takes the place of the inner bottom or top plating 2 appearing in Figs. 1 and 3 for example. In the newly designed boats this said seating 152 may be only provided in the places shown and the top plating 2 substantially omitted as illustrated.

In the present, as well as in the preceding construction, the boats are provided with pillars or stanchions such as 175 and 176 which are preferably located along a middle longitudinal line of the vessel, as indicated, and serve to stiffen and connect the bottom with the top structures. Said pillars or stanchions are conveniently made of the construction shown in Fig. 11 and pass down through the tanks to the top plating 2 or to the line of the seating 152 as illustrated. They are conveniently supported at the bottom by the longitudinal member 5 and its associated transverse floors, as clearly shown in Fig. 9.

Figure 11:
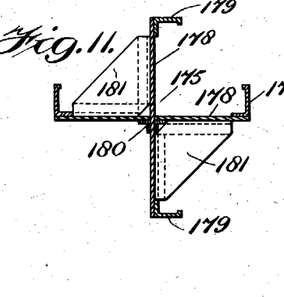
Fig. 11 is an enlarged detail view taken on the line 11—11 of Fig. 9.

As appears in Fig. 11, the said stanchions 175 are composed of the plates 178 provided at their outer edges with the angles 179 and are secured together as by the angles 180 and the stiffening plates 181 which are vertically spaced part as shown.

Figure 9:
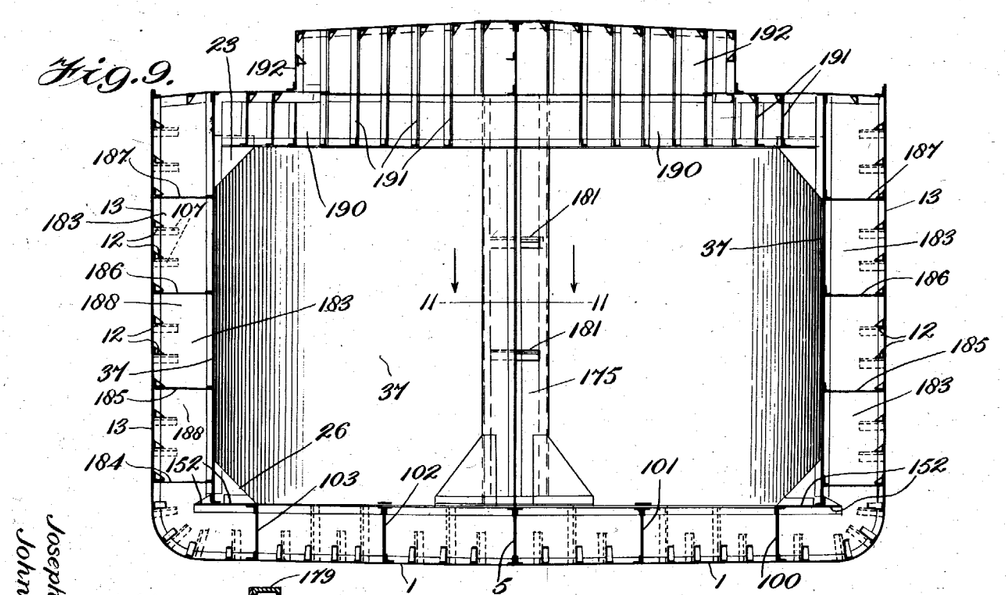
Fig. 9 is a transverse sectional view taken on the line 9—9 of Fig. 8.

As will be clear from Fig. 9 there is located in the longitudinal tank like spaces 183 between the outer skin of the ship and the outer walls of the tanks, the longitudinally disposed diaphragm plates or members such as 184, 185, 186 and 187 which are conveniently connected to the longitudinals 12, and which serve to stiffen the construction in a manner well understood. Said longitudinal members are crossed by the vertically disposed partial bulk-heads such as 188, 189, etc., see Fig. 8, for example.

Extending across the tanks at suitable intervals are the transverse girder like members such as 190 which may be conveniently stiffened as by the angles 191, and above said girders 190 are the expansion trunks 192 suitably sub-divided, and of the well known construction.

Figure 10:
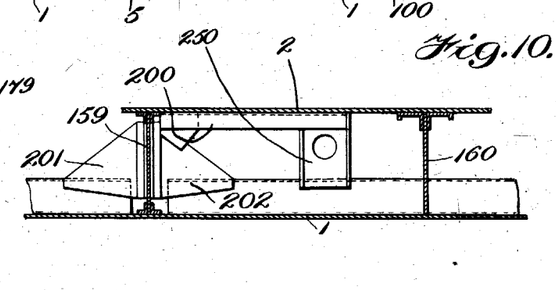
Fig. 10 is an enlarged detail view illustrating a bottom construction.

The top plating 2 or seating 152 may be suitably stiffened wherever desired as by the construction illustrated in Fig. 10, wherein 200 represents a longitudinal member connected to the transverse floor plates such as 159 by brackets such as 201 and 202.

Figure 12:
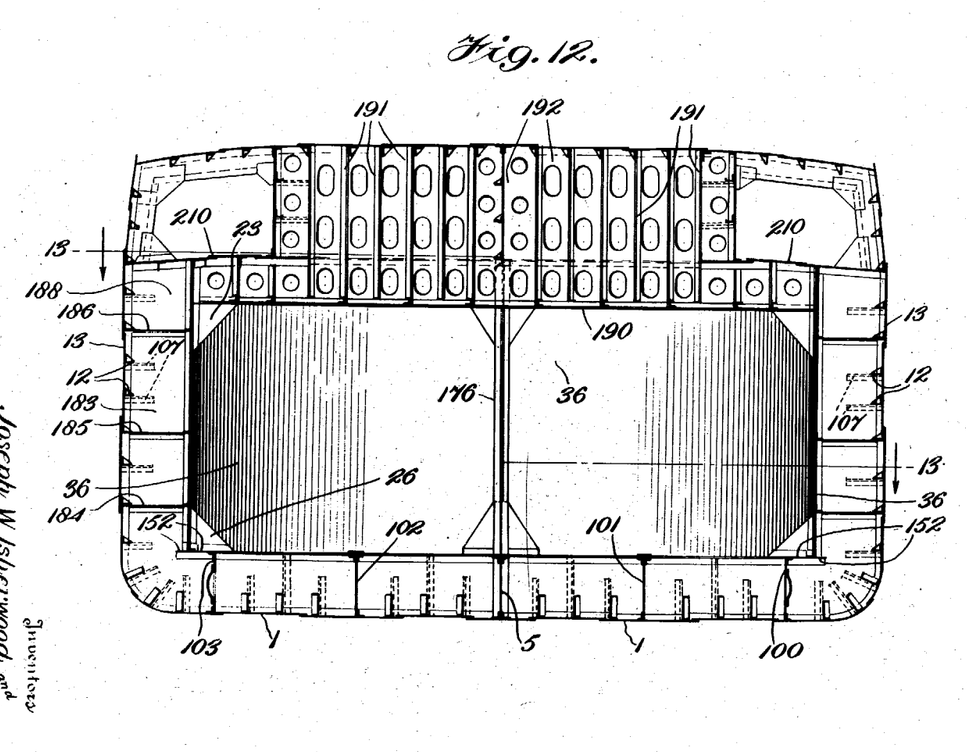
Fig. 12 is a cross sectional view taken on the line 12—12 of Fig. 13.
Figure 13:
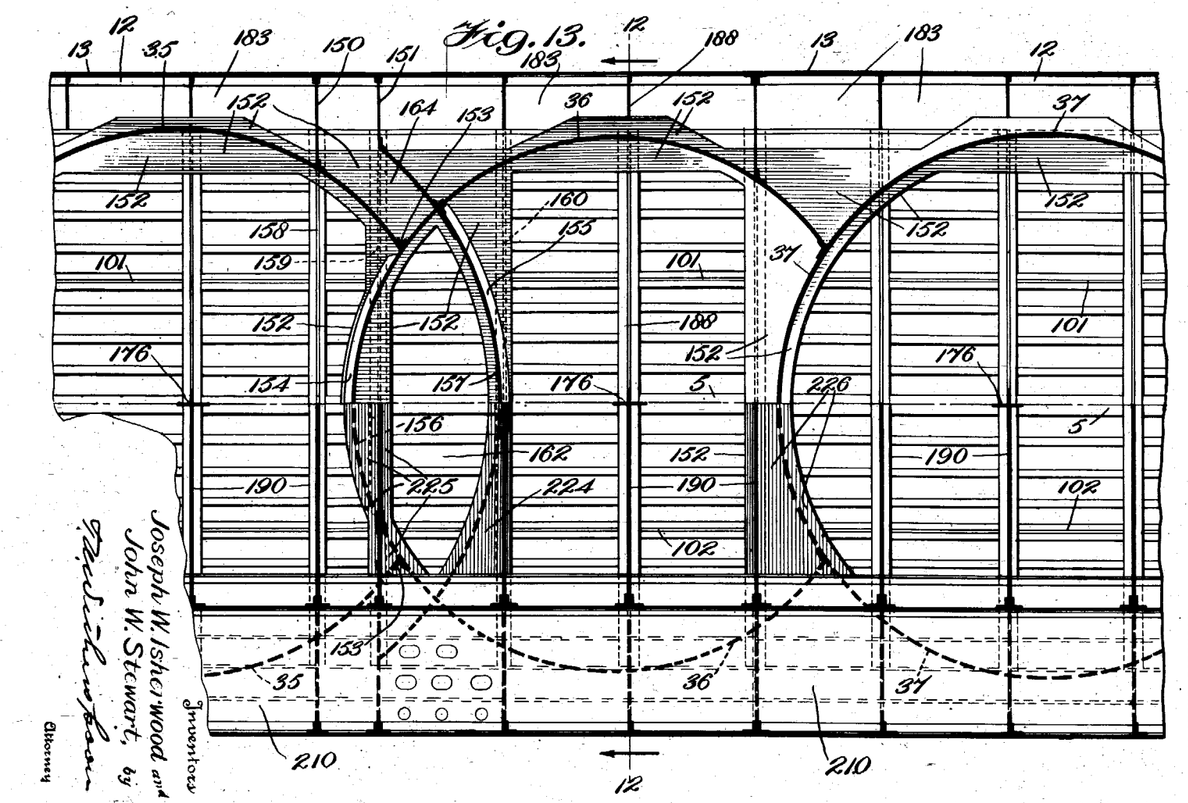
Fig. 13 is an enlarged sectional plan view taken on the line 13—13 of Fig. 12.

Referring now to Figs. 12 and 13 the construction in one sense, is a combination of the two preceding constructions in that it is applicable to newly designed boats, but is still provided with one or more lower decks such as 210. The other parts are or may be of substantially the same construction as in Fig. 9.

Referring especially to Fig. 13, it will be observed that the tank 35 is cut away and joined to the tank 36, by the angle 153, while the hoops 154 and 155 corresponding to the hoops 56 and 57 in Fig. 5 are provided on the walls 156 and 157 of said tanks respectively. It therefore follows that the partial bulk-heads 150 and 151 and the said floors 159 and 160 together with the seating 152 inclose a space 164 which corresponds in all respects to the space 70 of Fig. 5.

It will be observed that the seating 152 located in the space 162 rests upon the top edge of the continuous floor 159, and therefore, it prevents liquid from passing into the space 162 from the tank 35 in the manner precisely similar to the top plating 2 disclosed in connection with Fig. 5, and which in that figure prevents oil from passing from the tank 9 into the space 53. It will be consequently observed that the continuous transverse floor member 160 in Fig. 13 in connection with the said seating 152 located inside the tank 36 prevents the liquid from passing from said tank 36 into the space 162 and in the same way the said continuous floors 159 and 160 in connection with the seating 152 prevents liquid from passing from both the tanks 35 and 36 into the spaces 164 and 183, all as will be clear from the description of the like construction illustrated in Fig. 5, It will be further understood that in the construction shown in Figs. 7 to 13 it may be convenient to substantially duplicate at the top portions of the tanks the construction of the seating 152, in order to efficiently secure the top portions of said tanks to the top or deck construction of the vessel, and a portion of such top seating is illustrated in Fig. 13 and lettered 224, 225 and 226.

When desired similar top seatings for the tanks may be provided in connection with the construction shown in Figs. 3 to 6.

It will be clear from the foregoing that in all cases the tanks can be removed and the vessel converted into an ordinary freight or cargo vessel when desired.

As it is often desirable to carry liquid or other cargo in the spaces such as 14 and 183, located between the walls of the tanks and the sides of the vessel, it is desirable to connect these said side spaces with the interior of the tanks. Such connections may be readily effected by means of the holes 230 in the longitudinal girder 4, and illustrated in Fig. 3, or said spaces and tanks may be connected by any other means located at other suitable places not shown.

It will be understood that the walls of an extreme tank of a series may be readily attached to a transverse bulkhead such as 43, extending entirely across the vessel by attachments similar to those illustrated in Fig. 5. Of course, in such cases, in addition to the necessary fastenings or rigid connections, the bulk-heads are or may be stiffened wherever desired.

It will now be clear that by omitting, or cutting away, a portion of the wall of each tank and causing a portion of the wall of an adjacent tank to encroach upon, overlap, or enter the area that would have been occupied by said first named tank had said portion of its wall not been omitted, and then binding the whole series of tanks together by rigid fastenings at said cut away portions, said series of tanks are caused to take on the nature of longitudinal bulk-heads; and further, when said series of connected tanks are rigidly secured to the bottom, top, and side structures as disclosed, they are enabled in addition to their functions as containers, to discharge the functions of one or more longitudinal bulk-heads in stiffening the vessel.

In other words, the tanks constitute hollow intersecting cylinders, a preceding cylinder having a vertical portion of its wall omitted, thus providing a pair of vertically disposed edges as indicated at 50, Fig. 5, and a succeeding cylinder having a portion 52 of its wall disposed between said edges, and rigidly secured thereto. It thus results that the common end wall 52 of an adjacent pair of tanks extends along the same cylindrical contour lines as the remaining walls of said tanks. It will now be clear that this invention enables the naval architect to utilize the metal of the tanks in obtaining the requisite longitudinal strength, and that therefore he need not use as great a weight of metal in the ordinary class of vessel as usual. In other words, the naval architect can build a seaworthy vessel on this system with a total less weight of metal than has been heretofore thought possible in the ordinary tankers.

It is obvious that those skilled in the art may vary the details of construction, as well as the arrangement of parts without departing from the spirit of the invention, and therefore, it is not desired to be limited to the above disclosure except as may be required by the claims.

What we claim is:—

1. In a ship the combination of a pair of cylindrical tanks a portion of the walls of one of said tanks being omitted to provide a pair of vertically disposed edges, and a portion of the walls of the other tank extending between said edges to form a common end wall; fastening and stiffening connections between the meeting walls of said tanks; and additional fastening and stiffening connections between said tanks and the hull of the vessel adapted to cause said tanks to constitute a portion of the longitudinal stiffening of the ship, substantially as described.

2. In a ship the combination of a pair of tanks circular in cross section, a portion of the walls of one of said tanks being omitted to provide a pair of vertically disposed edges, and a portion of the walls of the other tank extending between said edges to form a common end wall; fastening and stiffening connections between the meeting walls of said tanks; and additional fastening and stiffening connections comprising a partial transverse bulk-head and connecting members between said tanks and the hull of the vessel adapted to cause said tanks to constitute a portion of the longitudinal stiffening of the ship, substantially as described.

3. In a ship the combination of a plurality of tanks located in a fore and aft line, a portion of the walls of each tank being omitted to provide a pair of vertically disposed edges; a portion of the wall of a succeeding tank extending between said edges to form a common end wall; rigid connections between adjacent tanks adapted to cause said tanks collectively to constitute a portion of the longitudinal stiffening of the ship; connections at the bottoms of said tanks rigidly securing them to the bottom structure of the vessel; connections at the top of said tanks rigidly securing them to the top structure of the vessel; and additional connections comprising a plurality of partial bulk-heads rigidly securing said tanks to the sides of the vessel, substantially as described.

4. In a ship the combination of a plurality of overlapping tanks circular in cross section, a portion of the walls of the one tank being omitted to accommodate a portion of the walls of an adjacent tank located between said edges to form a common end wall; rigid connections between said tanks at said omitted portions; rigid connections between the bottom edges of said tanks and the bottom structure of the vessel; rigid connections between the top portions of said tanks and the top structure of the vessel; and rigid connections between the sides of said tanks and the sides of said vessel, said tanks and connections constituting a material portion of the longitudinal strength of the vessel and the whole enabling the architect to employ a less weight of metal in the ship than has been heretofore customary in tank vessels, substantially as described.

5. In a ship the combination of a plurality of overlapping tanks circular in cross section, a portion of the walls of the one tank being omitted to provide a pair of vertically disposed edges a portion of the walls of an adjacent tank located between said edges to form a common end wall; rigid connections between said tanks at said omitted portions; rigid connections between the bottom edges of said tanks and the bottom structure of the vessel; rigid connections between the top portions of said tanks and the top structure of the vessel; rigid connections between the sides of said tanks and the sides of said vessel; and connections separating off a portion of the space inside said tanks to form a pump room or other oil tight space, said tanks and connections constituting a material portion of the longitudinal strength of the vessel and thereby enabling the architect to employ a less total weight of metal in the ship than has been heretofore customary in tank vessels, substantially as described.

6. In a ship the combination of a plurality of overlapping tanks circular in cross section, a portion of the walls of the one tank being omitted to accommodate a portion of the walls of an adjacent tank; rigid connections between said tanks at said omitted portions; rigid connections between the bottom edges of said tanks and the bottom structure of the vessel; rigid connections between the top portions of said tanks and the top structure of the vessel; rigid connections between the sides of said tanks and the sides of said vessel; and communicating means for connecting the space between the sides of said tanks and the sides of the ship with the interior of said tanks, or segregating said space from said interior at will; said tanks and connections constituting a material portion of the longitudinal strength of the vessel and the whole enabling the architect to employ a less weight of metal in the ship than has been heretofore customary in tank vessels, substantially as described.

7. In a ship provided with a double bottom having a top plating, the combination of a plurality of overlapping tanks circular in cross section open at their bottoms and overlying said plating, a portion of the walls of the one tank being omitted to form vertically disposed edges; a portion of the walls of an adjacent tank located between said edges; rigid connections between said tanks at said omitted portions; rigid connections between the bottom edges of said tanks and the bottom structure of the vessel; rigid connections between the top portions of said tanks and the top structure of the vessel; and rigid connections between the sides of said tanks and the sides of said vessel; said tanks and connections constituting a material portion of the longitudinal strength of the vessel and the whole enabling the architect to employ a less total weight of metal in the ship than has been heretofore customary in tank vessels, substantially as described.

8. In a ship the combination of a double bottom having a perforated top plating; a plurality of overlapping tanks circular in cross section open at their bottoms and overlying said perforated plating, a portion of the walls of the one tank being omitted to accommodate a portion of the walls of an adjacent tank; rigid connections between said tanks at said omitted portions; rigid connections between the bottom edges of said tanks and the perforated bottom structure of the vessel; rigid connections between the top portions of said tanks and the top and deck structure of the vessel; and rigid connections between the sides of said tanks and the sides of said vessel, said tanks and connections constituting a material portion of the longitudinal strength of the vessel and the whole enabling the architect to employ a less total weight of metal in the ship than has been heretofore customary in tank vessels, substantially as described.

9. In a ship the combination of a double bottom having perforations in the top plating thereof; a plurality of overlapping tanks circular in cross section open at their bottoms and overlying said perforations, a portion of the walls of the one tank being omitted to accommodate a portion of the walls of an adjacent tank; rigid connections between said tanks at said omitted portions; rigid connections between the bottom edges of said tanks and the bottom structure of the vessel; rigid connections between the top portions of said tanks and the top structure of the vessel; rigid connections between the sides of said tanks and the sides of said vessel; and means for preventing liquid contained in one tank from flowing through said perforations and double bottom to the interior of an adjacent tank, said tanks and connections constituting a material portion of the longitudinal strength of the vessel and thereby enabling the architect to employ a less total weight of metal in the ship than has been heretofore customary in the usual tank vessel, substantially as described.

10. In a ship provided with cut away decks the combination of a plurality of intersecting cylindrical tanks fitted to said decks; connections between said tanks at their overlapping portions; adjacent tanks provided with a common end wall following the cylindrical contour of said tanks; connections between said tanks and said cut away decks; and additional connections comprising transverse partial bulk-heads between said tanks and the sides of the ship; said tanks and connections constituting a material portion of the longitudinal stiffness of the vessel and thereby enabling the architect to employ a less total weight of metal in the construction than has been heretofore customary in converting a vessel into a tanker of the same kind and class, substantially as described.

11. In a ship the combination of a plurality of longitudinally disposed tanks extending on each side of the keel, located in contact with each other and having a common transverse wall of a cylindrical contour between adjacent tanks; fastening and stiffening connections between the contacting walls of said tanks; and additional fastening and stiffening connections between said tanks and the hull of the vessel, whereby said tanks constitute a portion of the longitudinal stiffening of the vessel, substantially as described.

In testimony whereof we affix our signatures, in presence of two witnesses.

JOSEPH WILLIAM ISHERWOOD.
JOHN WILLIAM STEWART.

Witnesses:
H. TENNANT,
HARRY C. POILLON.